United States Patent
Wada et al.

(10) Patent No.: US 10,761,663 B2
(45) Date of Patent: Sep. 1, 2020

(54) INPUT DEVICE

(71) Applicant: Alps Alpine Co., Ltd., Ota-ku, Tokyo (JP)

(72) Inventors: Suguru Wada, Niigata-ken (JP); Toru Sawada, Niigata-ken (JP); Junji Hashida, Niigata-ken (JP); Yoshifumi Masumoto, Niigata-ken (JP); Takenobu Horino, Niigata-ken (JP); Atsushi Matsuda, Niigata-ken (JP); Akihiro Takeda, Niigata-ken (JP); Koji Tsukamoto, Niigata-ken (JP); Toru Takahashi, Niigata-ken (JP); Minoru Sato, Niigata-ken (JP)

(73) Assignee: Alps Alpine Co., Ltd., Tokyo (JP)

( * ) Notice: Subject to any disclaimer, the term of this patent is extended or adjusted under 35 U.S.C. 154(b) by 0 days.

(21) Appl. No.: 16/155,599

(22) Filed: Oct. 9, 2018

(65) Prior Publication Data

US 2019/0050083 A1 Feb. 14, 2019

Related U.S. Application Data

(63) Continuation of application No. PCT/JP2017/009397, filed on Mar. 9, 2017.

(30) Foreign Application Priority Data

May 12, 2016 (JP) ................................. 2016-095858

(51) Int. Cl.
*G06F 3/044* (2006.01)

(52) U.S. Cl.
CPC .... *G06F 3/044* (2013.01); *G06F 2203/04102* (2013.01); *G06F 2203/04112* (2013.01)

(58) Field of Classification Search
None
See application file for complete search history.

(56) References Cited

U.S. PATENT DOCUMENTS

| 2015/0070312 | A1 | 3/2015 | Her et al. |
| 2016/0011689 | A1* | 1/2016 | Kim ........................ G06F 3/044 |
| | | | 345/173 |

(Continued)

FOREIGN PATENT DOCUMENTS

| JP | 2010-165094 | 7/2010 |
| JP | 2010-165094 A | 7/2010 |

(Continued)

OTHER PUBLICATIONS

International Search Report from International Application No. PCT/JP2017/009397 dated May 16, 2017.

(Continued)

*Primary Examiner* — Kenneth B Lee, Jr.
(74) *Attorney, Agent, or Firm* — Beyer Law Group LLP

(57) ABSTRACT

An input device includes a translucent base material having flexibility, translucent first electrode parts arranged in a sensing region on the base material in a first direction, translucent second electrode parts arranged in the sensing region on the base material in a second direction crossing the first direction, and lead wires that are electrically continuous to the first electrode parts and second electrode parts, the lead wires extending from the sensing region on the base material to a peripheral region allocated outside the sensing region. A bent portion is provided in the peripheral region on the base material. Each lead wire has a flexible conductive member on the bent portion. A covering material is provided so as cover at least part of the flexible conductive member on the base material.

18 Claims, 9 Drawing Sheets

(56) References Cited

U.S. PATENT DOCUMENTS

| | | | |
|---|---|---|---|
| 2016/0104549 | A1 | 4/2016 | Shida et al. |
| 2016/0239121 | A1 | 8/2016 | Murakami et al. |
| 2017/0139511 | A1 | 5/2017 | Ohsawa et al. |

FOREIGN PATENT DOCUMENTS

| | | |
|---|---|---|
| JP | 2013-186633 A | 9/2013 |
| JP | 2015-028211 | 2/2015 |
| JP | 2015-28211 A | 2/2015 |
| TW | 201514820 | 4/2015 |
| WO | 2015/147323 | 11/1917 |
| WO | 2015/147323 A1 | 1/2015 |

OTHER PUBLICATIONS

Taiwanese Office Action dated Oct. 2, 2018 from Taiwanese Application No. 107107043.

* cited by examiner

INPUT DEVICE

CLAIM OF PRIORITY

This application is a Continuation of International Application No. PCT/JP2017/009397 filed on Mar. 9, 2017, which claims benefit of Japanese Patent Application No. 2016-095858 filed on May 12, 2016. The entire contents of each application noted above are hereby incorporated by reference.

BACKGROUND OF THE INVENTION

1. Field of the Invention

The present invention relates to an input device in which a plurality of electrode parts for use for detection are provided on a base material having translucency and flexibility.

2. Description of the Related Art

Many touch panels that sense a capacitance are used as input devices used as part of mobile terminals and other various types of electronic devices. Japanese Unexamined Patent Application Publication No. 2013-186633 describes a transparent conductive film in which, to achieve a narrowed frame and reduced thickness, a lower-layer wiring part and an upper-layer wiring part are provided and a transparent circuit board is bent.

U.S. Patent Application Publication No. 2015/0070312 describes a touch window that includes a circuit board having a first sensing region and a second sensing region, a first sensing electrode provided on the first sensing region, the first sensing electrode detecting a position, and a second sensing electrode provided on the second sensing region, the second sensing electrode detecting a position. In this touch window, the material of the first sensing electrode differs from the material of the second sensing electrode. A structure in which the second sensing electrode is bent from the first sensing electrode is also described.

SUMMARY OF THE INVENTION

However, when an indium tin oxide (ITO) material and a metal, which are used as a translucent electrode or lead wire, are bent, they are likely to cause a crack or conduction failure, so there is the problem that it is difficult to use them at bent portions. Therefore, to provide a wire a bent portion on a base material, the wire needs to be formed by using an easy-to-bend material (such as, for example, a conductive polymer (poly(3,4 ethylenedioxythiophene)/poly(styrenesulfonate) (PEDOT/PSS) or the like) or a metal nanowire). However, if an easy-to-use material like this is used, a problem arises in that translucency and conductivity are lowered and wires are not easily thinned.

The present invention provides an input device for which a structure in the vicinity of a bent portion was improved so that wires can be bent together with a base material without impairing translucency and conductivity.

To solve the above problem, the input device in the present invention has: a base material having translucency and flexibility; a plurality of first electrode parts having translucency, the plurality of first electrode parts being arranged in a sensing region on the base material in a first direction; a plurality of second electrode parts having translucency, the plurality of second electrode parts being arranged in the sensing region on the base material in a second direction crossing the first direction; and a plurality of lead wires that are electrically continuous to the plurality of first electrode parts and the plurality of second electrode parts, the plurality of lead wires extending from the sensing region on the base material to a peripheral region allocated outside the sensing region. A bent portion is formed in the peripheral region on the base material. Each of the plurality of lead wires has a flexible conductive member provided on the bent portion. A covering material is provided so as to cover at least part of the flexible conductive member on the bent portion.

A tensile stress generated in the flexible conductive member provided at the bent portion of the base material causes a crack in the flexible conductive member. However, when the covering material covers at least part of the flexible conductive member, the degree of the tensile stress generated in the flexible conductive member can be mitigated by the covering material. There is no limitation on the material forming the covering material. Examples of the material of the covering material preferably include resin-based materials. In this description, the resin-base material means a material the main component of which is a macromolecule (polymer). If the covering material is made of a resin-based material, when the bent portion enters a state in which it is bent and an external force that causes a tensile stress is applied to the flexible conductive member, a cohesion force is generated in the covering material according to this external force. This cohesion force is exerted so as to mitigate the tensile stress generated in the flexible conductive member.

The input device in the present invention may have a reinforcing member that lowers the degree of the bend of the flexible conductive member. As an example, the reinforcing member is preferably a reinforcing film provided on a side, of the bent portion, opposite to a side on which the flexible conductive member is provided. When the input device has this structure, the degree of the bend of the flexible conductive member provided on the bent portion can be lowered, so the generation of a tensile stress in the flexible conductive member is suppressed.

The input device in the present invention may further have an optical adhesive layer disposed so as to cover the sensing region on the base material. The use of this optical adhesive layer makes it easy to maintain the relative positions of a protective member and the base material. If the optical adhesive layer is further provided, the optical adhesive layer may extend from the sensing region toward a peripheral region so that a laminated structure composed of the flexible conductive member, covering material, and optical adhesive layer is formed. If the optical adhesive layer extends toward the circumferential and is positioned so as to cover a bent portion of the flexible conductive member, a cohesion force that opposes deformation due to the bend is generated in a highly transparent adhesive layer forming the optical adhesive layer. This cohesion force generated in this highly transparent adhesive layer can become an external force that generates a tensile stress in the flexible conductive member. However, since the covering material is positioned between the optical adhesive layer and the flexible conductive member, it is possible to restrain the cohesion force of the highly transparent adhesive layer from being transmitted to the flexible conductive member.

If the input device further has the optical adhesive layer as described above, the optical adhesive layer extends from the sensing region toward the peripheral region. However, the optical adhesive layer may be placed so as not to cover a bent portion of the flexible conductive member. In this case, the optical adhesive layer becomes less likely to be bent. This lowers the possibility that a cohesion force that can become an external force that generates a tensile stress in the flexible conductive member is generated in the highly transparent adhesive layer forming the optical adhesive layer.

In the input device in the present invention, the lead wire may have a first wire part disposed closer to the sensing region than is the bent portion, and may also have a second wire part disposed more far from the sensing region than is the bent portion. The flexible laminated body may be positioned between the first wire part and the second wire part. The flexible conductive member may be composed of a flexible laminated body that has a first amorphous ITO layer provided on the base material, a conductive layer provided on the first amorphous ITO layer, and a second amorphous ITO layer provided on the conductive layer.

According to the present invention, it becomes possible to provide an input device that enables wires to be bent together with a base material without impairing translucency and conductivity of the wires.

DESCRIPTION OF THE PREFERRED EMBODIMENT

Figure 1:
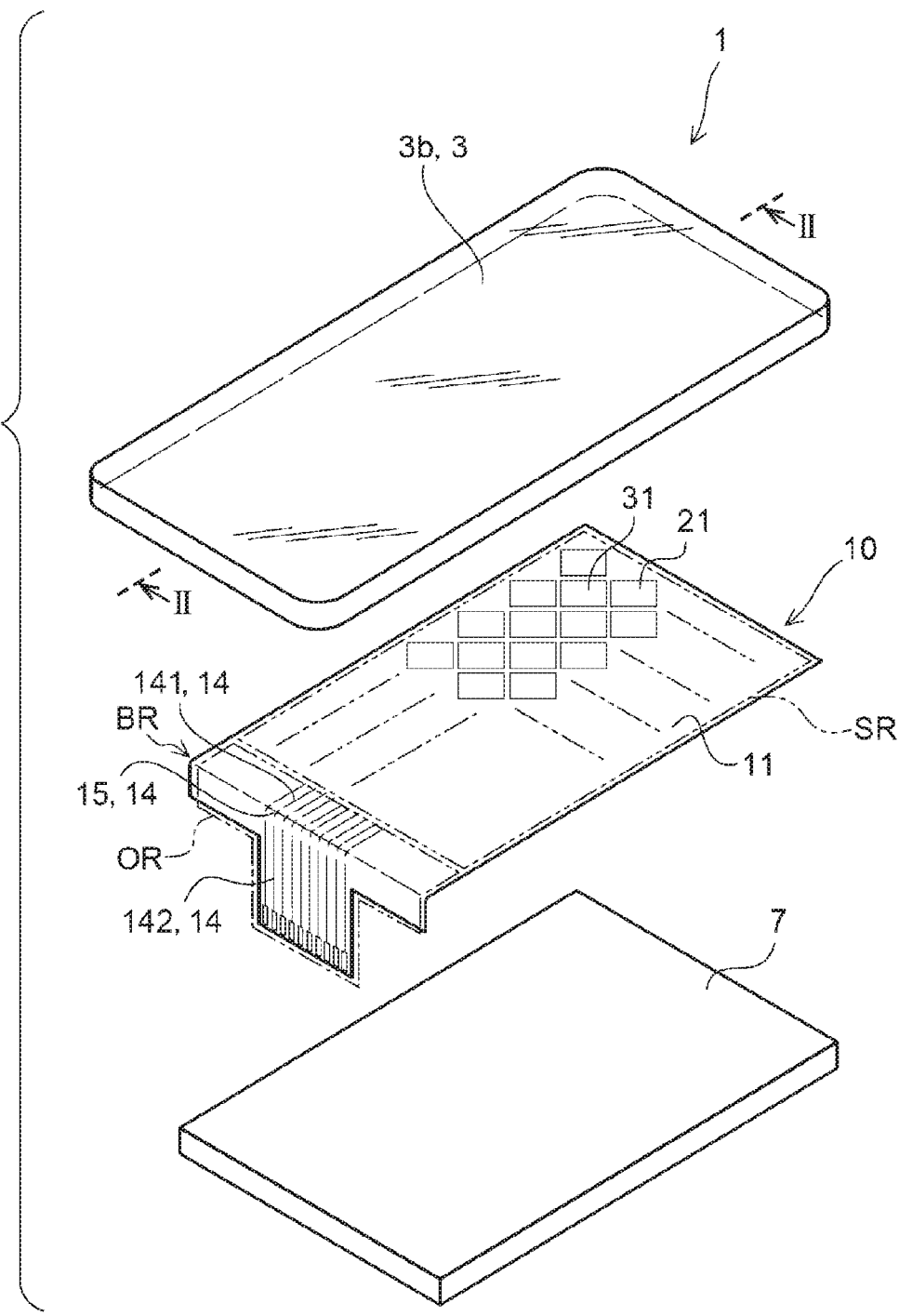
FIG. 1 is an exploded perspective view illustrating an electronic device to which an input device according to this embodiment is applied.

An embodiment of the present invention will be described with reference to the drawings. In the description below, like members will be assigned like reference characters. For members that have been described once, their description will be appropriately omitted.

Electronic Device to which an Input Device is Applied

Figure 2:
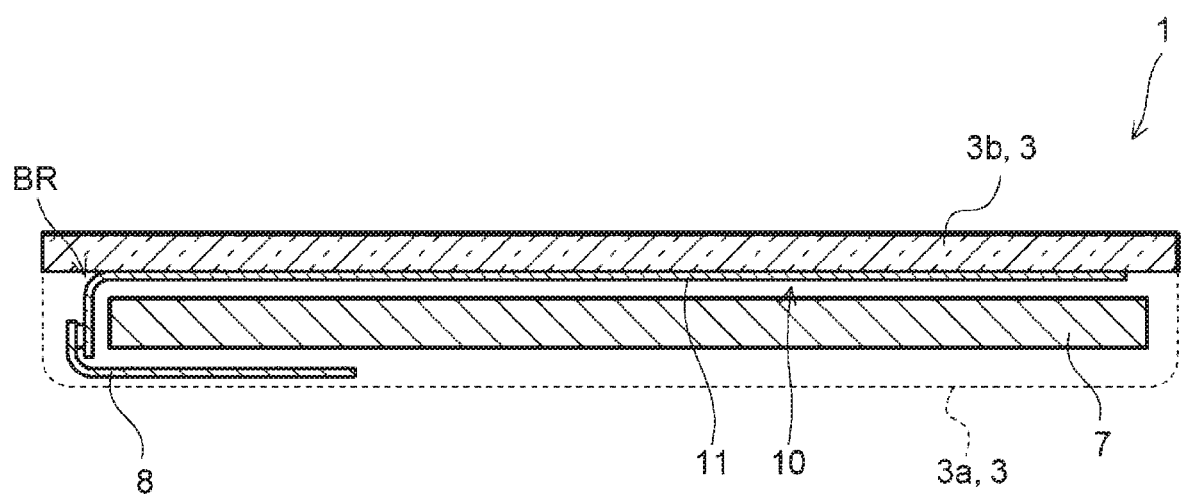
FIG. 2 is a cross-sectional view taken along line II-II in FIG. 1.

FIG. 1 is an exploded perspective view illustrating an electronic device to which an input device according to this embodiment is applied. FIG. 2 is a cross-sectional view taken along line II-II in FIG. 1.

As illustrated in FIGS. 1 and 2, the electronic device 1 has a case 3. The case 3 is formed by a combination of a main body case section 3a and a panel section 3b. For convenience of explanation, the main body case section 3a is indicated only in FIG. 2 by dashed lines. The main body case section 3a is formed from, for example, a synthetic resin material. The main body case section 3a has a box-like shape, the top of which is open. The panel section 3b is placed so as to cover the opening of the main body case section 3a.

The panel section 3b is formed from a translucent resin material such as a glass, a polycarbonate resin, or an acrylic resin. In this description, "translucency" and "transparent" mean a state in which the transmittance of visible light is 50% or more (preferably 80% or more).

A base material 11 having translucency and flexibility is placed inside the panel section 3b. A wiring board 8 joined to an end of the base material 11 is accommodated in the case 3. The wiring board 8 is, for example, a flexible wiring board. A display panel 7 such as a liquid crystal display panel or electroluminescent display panel is also accommodated in the case 3. An image displayed on the display panel 7 is transmitted through the base material 11 and panel section 3b, so the image is visible from the outside.

Part of the base material 11 is bonded to the inner surface of the panel section 3b with, for example, an optically clear adhesive (OCA), which is an adhesive with high transparency. The base material 11 is formed from a resin film having translucency such as a polyethylene terephthalate (PET) film having flexibility or a polycarbonate (PC) film. The base material 11 may include an optical adjustment layer (silicon dioxide ($SiO_2$) or the like) or hard coat layer provided on the surface of the PET file or the like. A plurality of first electrode parts 21 and a plurality of second electrode parts 31 are formed on the surface of the base material 11.

The plurality of first electrode parts 21 are orderly arranged in a sensing region SR on the base material 11 in a first direction. The plurality of second electrode parts 31 are also orderly arranged in the sensing region SR on the base material 11 in a second direction crossing the first direction. With the electronic device 1 according to this embodiment, the first direction and second direction are mutually orthogonal, as illustrated in FIG. 1. On the base material 11, a plurality of lead wires 14 that are electrically continuous to these first electrode parts 21 and second electrode parts 31 are provided. Each lead wire 14 extends from the sensing region SR on the base material 11 to a peripheral region OR allocated outside the sensing region SR. An input device 10, which is of a capacitance type, includes the base material 11, first electrode parts 21, second electrode parts 31, and lead wires 14. The first electrode parts 21, second electrode parts 31, and lead wires 14 will be described later in detail.

In this embodiment, a bent portion BR is provided in the peripheral region OR on the base material 11. The lead wire 14 preferably has a first wire part 141 disposed closer to the sensing region SR than is the bent portion BR, a second wire part 142 disposed more far from the sensing region SR than is the bent portion BR, and a flexible laminated body 15, which is preferably positioned between the first wire part 141 and the second wire part 142 and disposed on the bent portion BR.

Figure 3A:
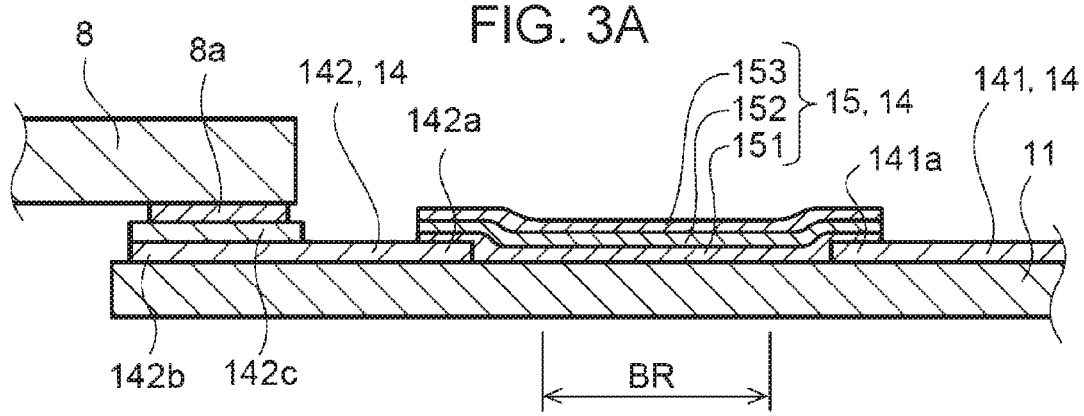
FIGS. 3A and 3B are schematic cross-sectional views illustrating a flexible laminated body.
Figure 3B:
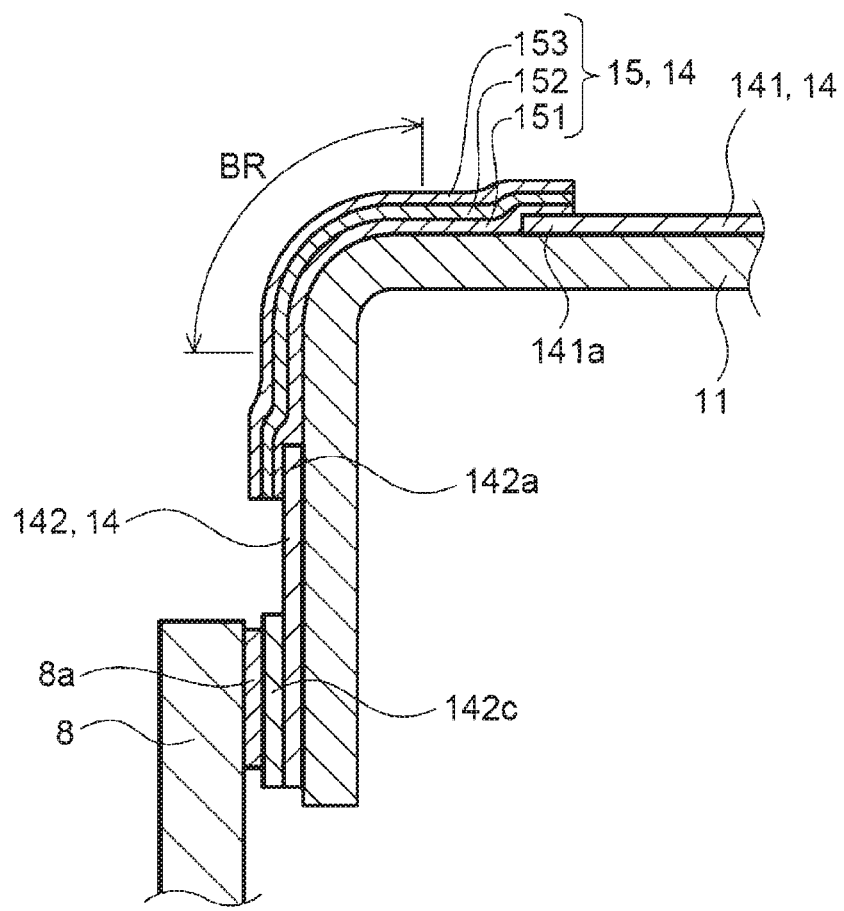

FIGS. 3A and 3B are schematic cross-sectional views illustrating the flexible laminated body 15. FIG. 3A illustrates a state in which the base material 11 is not bent, and FIG. 3B illustrates a state in which the base material 11 is bent.

A flexible conductive member is provided on the bent portion BR. In the input device illustrated in FIGS. 3A and 3B, the flexible laminated body 15 is provided as an example of the flexible conductive member. The flexible laminated body 15 preferably has a first amorphous ITO layer 151 provided on the base material 11, a conductive layer 152 provided on the first amorphous ITO layer 151, and a second amorphous ITO layer 153 provided on the conductive layer 152.

The first amorphous ITO layer 151 preferably has a portion that is in contact with the base material 11. Thus, the resistance of the flexible laminated body 15 to the bending can be more stably improved. A conductive material having specific resistance lower than that of the first amorphous ITO layer 151 is used for the conductive layer 152. For example, a noble metal such as Au, Ag, Cu, Pt, or Pd, Ni, or an alloy including at least any of them (a specific example is a CuNi alloy) is used for the conductive layer 152. In this embodiment, Au is used as the material of the conductive layer 152. The conductive layer 152 may have a laminated structure.

The second amorphous ITO layer 153 is provided on the conductive layer 152 to serve to restrain the conductive layer 152 from being visually recognized from the outside. A connecting part 141a is provided at an end of the first wire part 141, and a connecting part 142a is provided at an end of the second wire part 142. Both ends of the flexible laminated body 15 are connected to these connecting parts 141a and 142a. A metal layer 142c is provided at an end 142b of the second wire part 142, the end 142b being opposite to the connecting part 142a of the second wire part 142. This metal layer 142c forms part of a terminal part connected to a metal terminal 8a provided on the wiring board 8.

The surfaces, facing the flexible laminated body 15, of the connecting parts 141a and 142a preferably have a crystallized ITO surface. More preferably, these surfaces are a crystallized ITO surface. This enables the first amorphous ITO layer 151 of the flexible laminated body 15 to more tightly adhere (more strongly connects) to the connection parts 141a and 142a.

The first wire part 141 of the lead wire 14 may include a crystallized ITO layer. The second wire part 142 of the lead wire 14 may also include a crystallized ITO layer. Accordingly, it is possible to improve the translucency of the first wire part 141 and second wire part 142 and to reduce their resistances, and also possible to form the connecting parts 141a and 142a, which are composed of a crystallized ITO layer, in the process in which the first wire part 141 and second wire part 142 are formed.

As a specific example, the first wire part 141 is formed from a crystallized ITO material. As for the second wire part 142, the connecting part 142a is formed from a crystallized ITO material, and the end 142b opposite to the connection part 142a is formed by forming a crystallized ITO layer and also forming the metal layer 142c (a laminated structure including CuNi, Cu, and CuNi in that order, for example) on the crystallized ITO layer.

When a laminated structure including the first amorphous ITO layer 151, conductive layer 152, and second amorphous ITO layer 153 is formed as the flexible laminated body 15, it is possible to achieve both transparency and flexibility due to amorphous ITO and a reduction in resistance due to the conductive layer 152. For example, even if the radius of curvature of the bent portion BR of the base material 11 is 5 mm or less, the base material 11 can have adequate resistance to mechanical fracture and electric disconnection. That is, when the flexible laminated body 15 is provided at the bent portion BR, it is possible to bend the base material 11 in a state in which its translucency and conductivity are maintained.

The flexible laminated body 15 provided on the bent portion BR is bent along with the deformation of the base material 11 at the bent portion BR. At that time, a tensile stress is noticeably generated in the flexible laminated body 15 on a side opposite to the base material 11. This tensile stress can cause a crack in the flexible laminated body 15.

Figure 4:
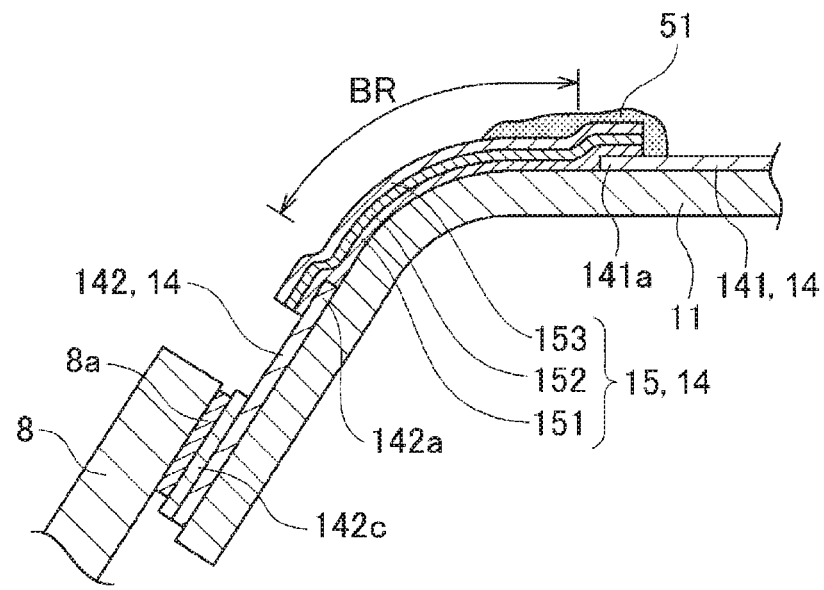
FIG. 4 is a schematic cross-sectional view illustrating a covering material.

FIG. 4 is a schematic cross-sectional view illustrating a covering material. As illustrated in FIG. 4, when the covering material 51 is provided so as to cover at least part of the flexible laminated body (an example of the flexible conductive member) 15, which is in a state in which it is bent on the bent portion BR, a tensile stress is less likely to be generated in the flexible laminated body 15. Therefore, when the covering material 51 is provided, the possibility that a crack is generated in the flexible laminated body 15 can be lowered. The covering material 51 may be disposed so as to cover the whole of the flexible laminated body 15 or may have portions that cover the first wire part 141 and second wire part 142 connected to the flexible laminated body 15.

There is no limitation on the material of the covering material 51. Examples of the material of the covering material 51 preferably include resin-based materials. An epoxy resin is a specific example of resin materials included in resin-based materials. Resin-based materials may include inorganic materials such as silica fillers and alumina fillers. If the covering material 51 is made of a resin-based material, when the bent portion BR enters a state in which it is bent and an external force that causes a tensile stress is given to the flexible laminated body 15, a cohesion force is generated in the covering material 51 so as to oppose this external force. Due to this cohesion force, the external force to be applied to the flexible laminated body 15 can be lowered.

Figure 5:
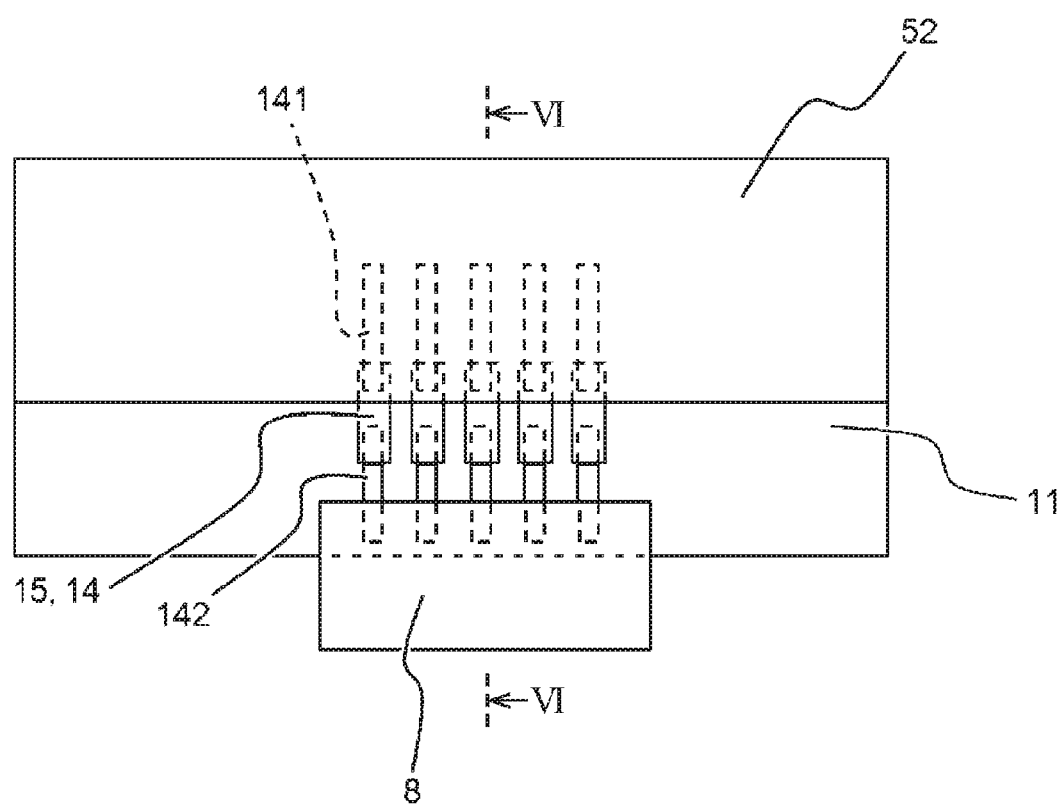
FIG. 5 is a schematic cross-sectional view illustrating an optical adhesive layer.
Figure 6:
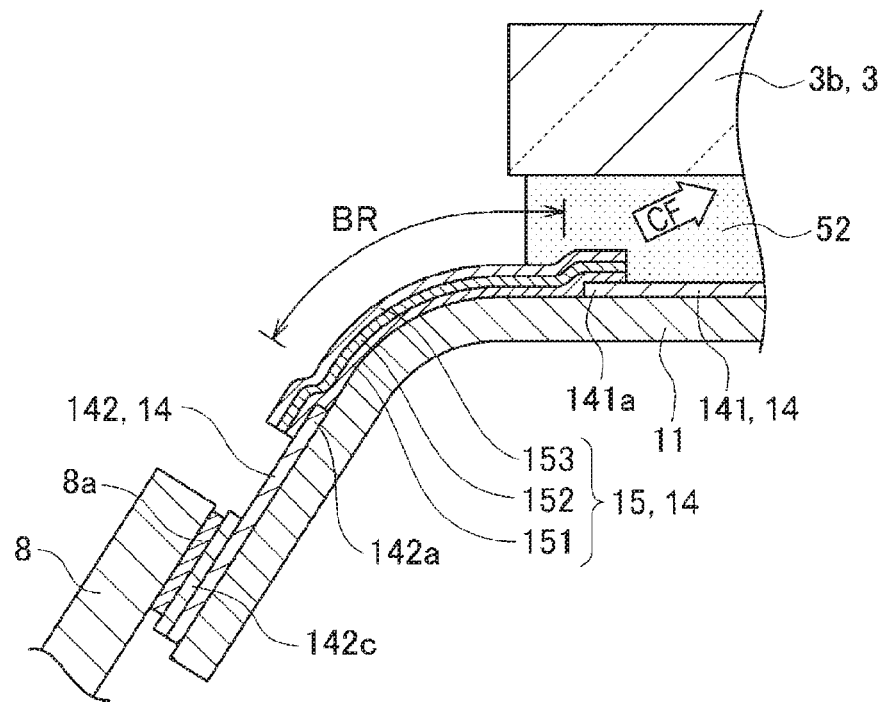
FIG. 6 is a cross-sectional view taken along line VI-VI in FIG. 5.
Figure 7:
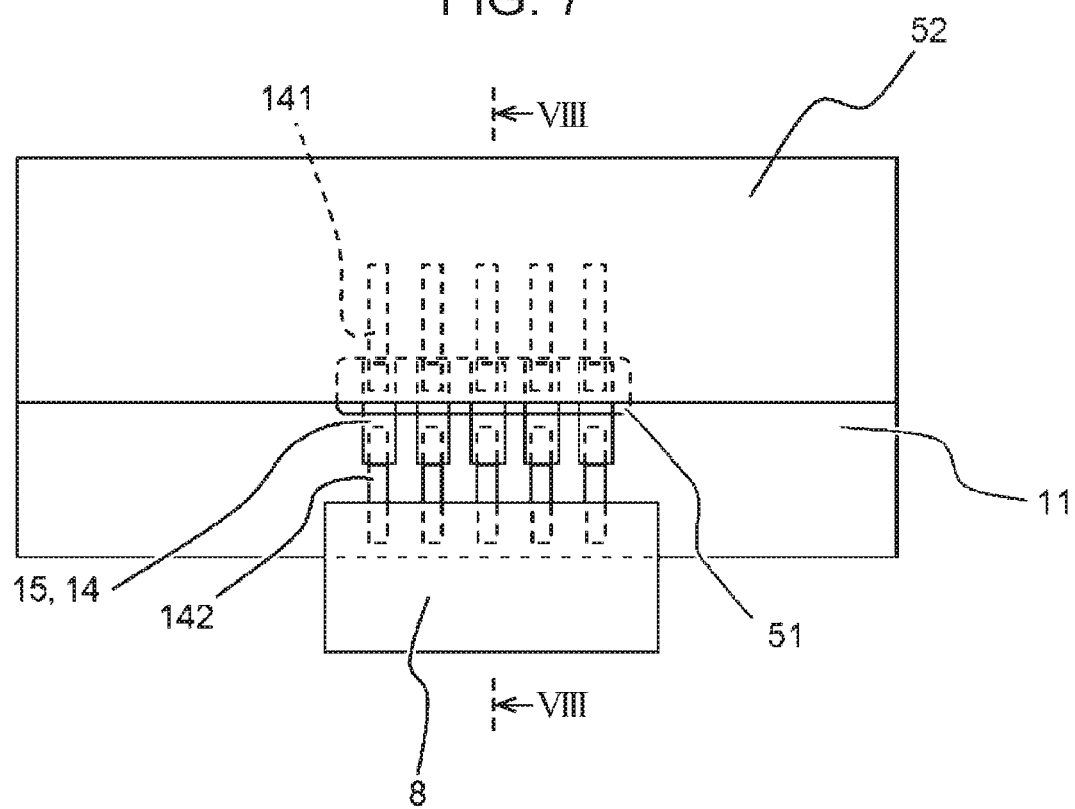
FIG. 7 is a schematic plan view illustrating the covering material in a case in which the optical adhesive layer is provided.
Figure 8:
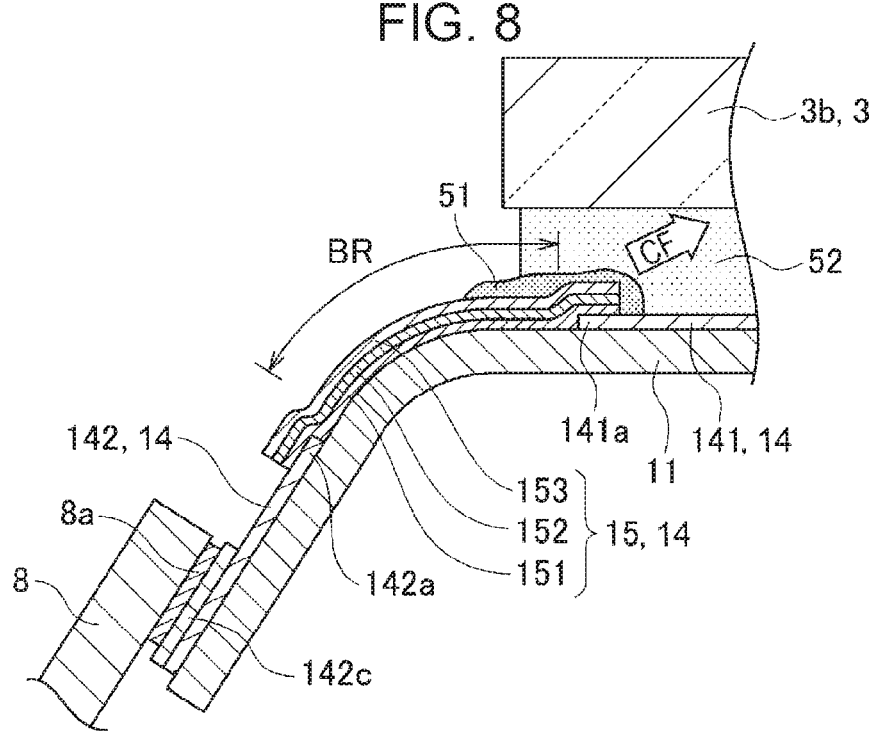
FIG. 8 is a cross-sectional view taken along line VIII-VIII in FIG. 7.
Figure 9:
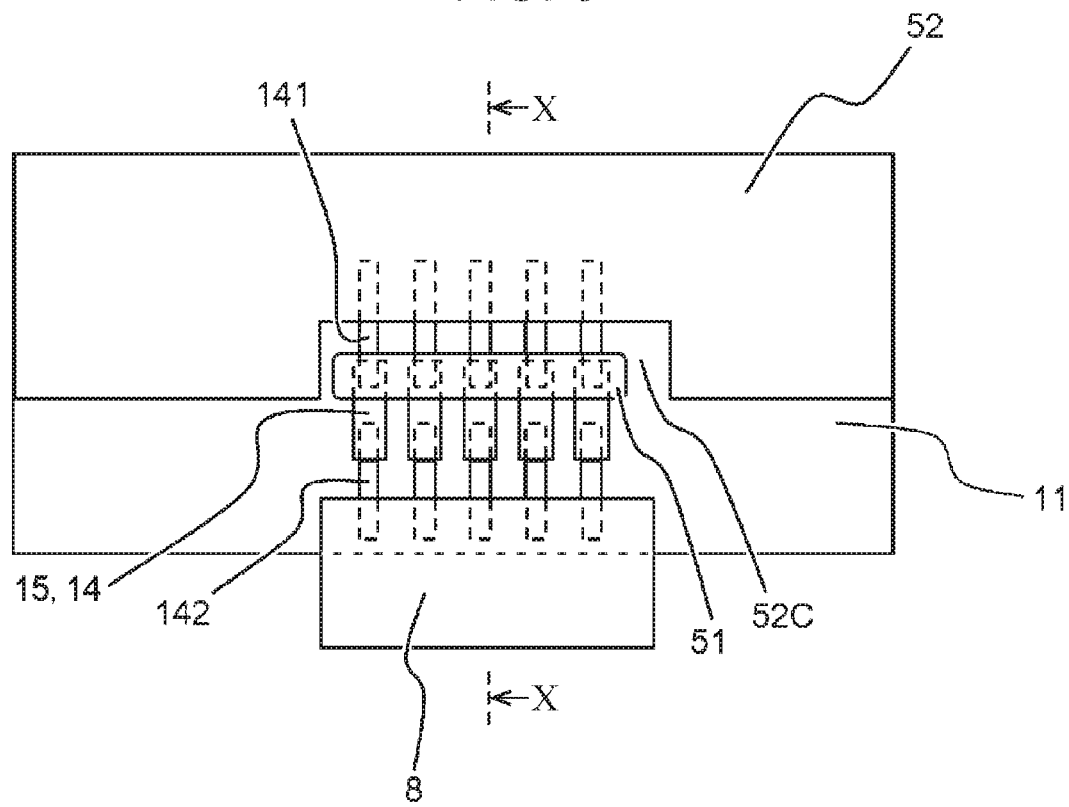
FIG. 9 is a schematic plan view illustrating the covering material and a notch in a case in which the optical adhesive layer is provided.
Figure 10:
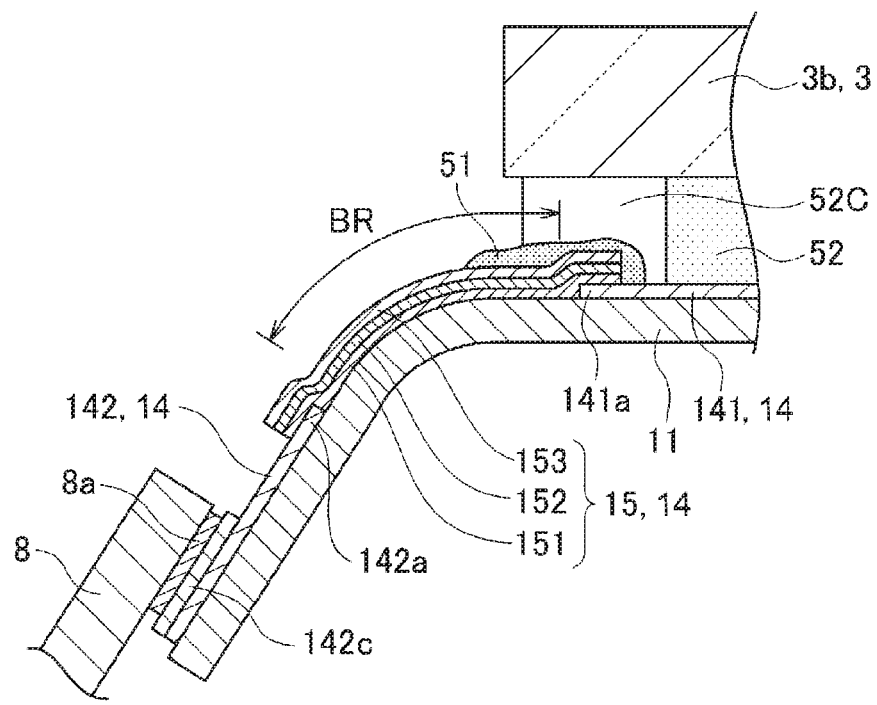
FIG. 10 is a cross-sectional view taken along line X-X in FIG. 9.
Figure 11:
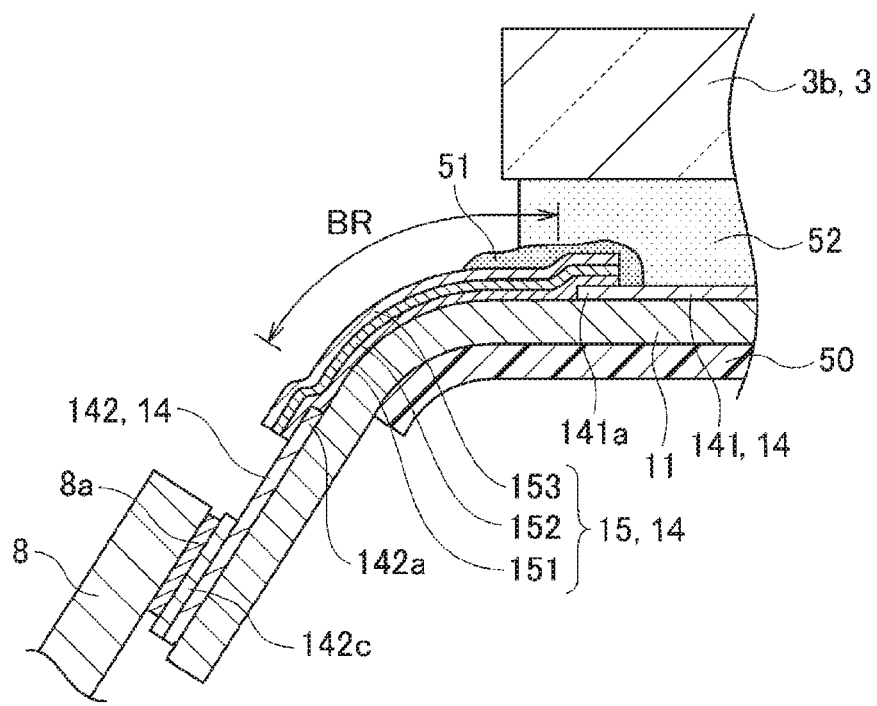
FIG. 11 is a schematic plan view illustrating a reinforcing member.

FIG. 5 is a schematic cross-sectional view illustrating an optical adhesive layer. FIG. 6 is a cross-sectional view taken along line VI-VI in FIG. 5. FIG. 7 is a schematic plan view illustrating the covering material in a case in which the optical adhesive layer is provided. FIG. 8 is a cross-sectional view taken along line VIII-VIII in FIG. 7. FIG. 9 is a schematic plan view illustrating the covering material and a notch in a case in which the optical adhesive layer is provided. FIG. 10 is a cross-sectional view taken along line X-X in FIG. 9. FIG. 11 is a schematic plan view illustrating a reinforcing member.

An optical adhesive layer 52 composed of a highly transparent adhesive is positioned between the base material 11 and the panel section 3b (3). Due to the adhesiveness of the highly transparent adhesive and the cohesion force, relative positions of the base material 11 and the panel section 3b (3) are maintained. The optical adhesive layer 52 may extend from the sensing region SR toward the peripheral region OR and the highly transparent adhesive forming the optical adhesive layer 52 may adhere to the flexible laminated body 15 as well as illustrated in FIGS. 5 and 6. In this case, if the bent portion BR is bent, a positional change occurs by which the flexible laminated body 15 and panel section 3b (3) are separated from each other due to this bend. Therefore, a cohesion force CF is generated in the highly transparent adhesive forming the optical adhesive layer 52 positioned between the flexible laminated body 15 and the panel section 3b (3) in a direction in which the optical adhesive layer 52 tries to recover from this positional change (see FIG. 6). This cohesion force CF is exerted as a tensile force to the flexible laminated body 15, which is deformed along the bend at the bent portion BR. Accordingly, if the highly transparent adhesive forming the optical adhesive layer 52 is present on the flexible laminated body 15 as illustrated in FIGS. 5 and 6, a tensile stress due to the cohesion force of the highly transparent adhesive is likely to be generated in the flexible laminated body 15.

In view of this, a laminated structure of the flexible laminated body 15, which is an example of a flexible conductive layer, the covering material 51, and the optical adhesive layer 52 is preferably formed as illustrated in FIGS. 7 and 8. Since the covering material 51 is positioned between the optical adhesive layer 52 and the flexible laminated body 15, the tensile force based on the cohesion force CF of the highly transparent adhesive forming the optical adhesive layer 52 is first transmitted to the covering material 51. In the covering material 51, the tensile force from the highly transparent adhesive forming the optical adhesive layer 52 is mitigated by, for example, the cohesion force of the resin-based material forming the covering material 51. Therefore, it is possible to restrain the tensile force transmitted from the highly transparent adhesive forming the optical adhesive layer 52 from being further transmitted to the flexible laminated body 15.

To avoid the transmission of the tensile stress from the highly transparent adhesive forming the optical adhesive layer 52 to the flexible laminated body 15, a notch 52C may be formed at part of the optical adhesive layer 52 as illustrated in FIGS. 9 and 10 so that the highly transparent adhesive forming the optical adhesive layer 52 does not cover a bent portion of the flexible laminated body 15.

At the bent portion BR, a reinforcing member may be further provided that lowers the degree of the bend of the flexible laminated body 15, which is an example of the flexible conductive member. In FIG. 11, a reinforcing film 50 preferably provided on a side, of the bent portion BR, opposite to the side on which the flexible laminated body 15 is provided is illustrated. When an external force to bend the bent portion BR is given, since the reinforcing film 50 is provided, the degree of the bend of the bent portion BR is lowered. Therefore, the degree of the bend of the flexible laminated body 15 provided on the bent portion BR is also lowered. As a result, the degree of the tensile stress generated in the flexible laminated body 15 is lowered. As specific examples of the reinforcing film 50, resin films having translucency such as a PET (polyethylene terephthalate) film and a PC (polycarbonate) film are included. There is a case in which it is preferable for the reinforcing film 50 to be formed from a film having lower flexibility (lower stiffness) than a film that constitutes the base material 11 positioned at the bent portion BR.

Electrodes and Wires

Figure 12:
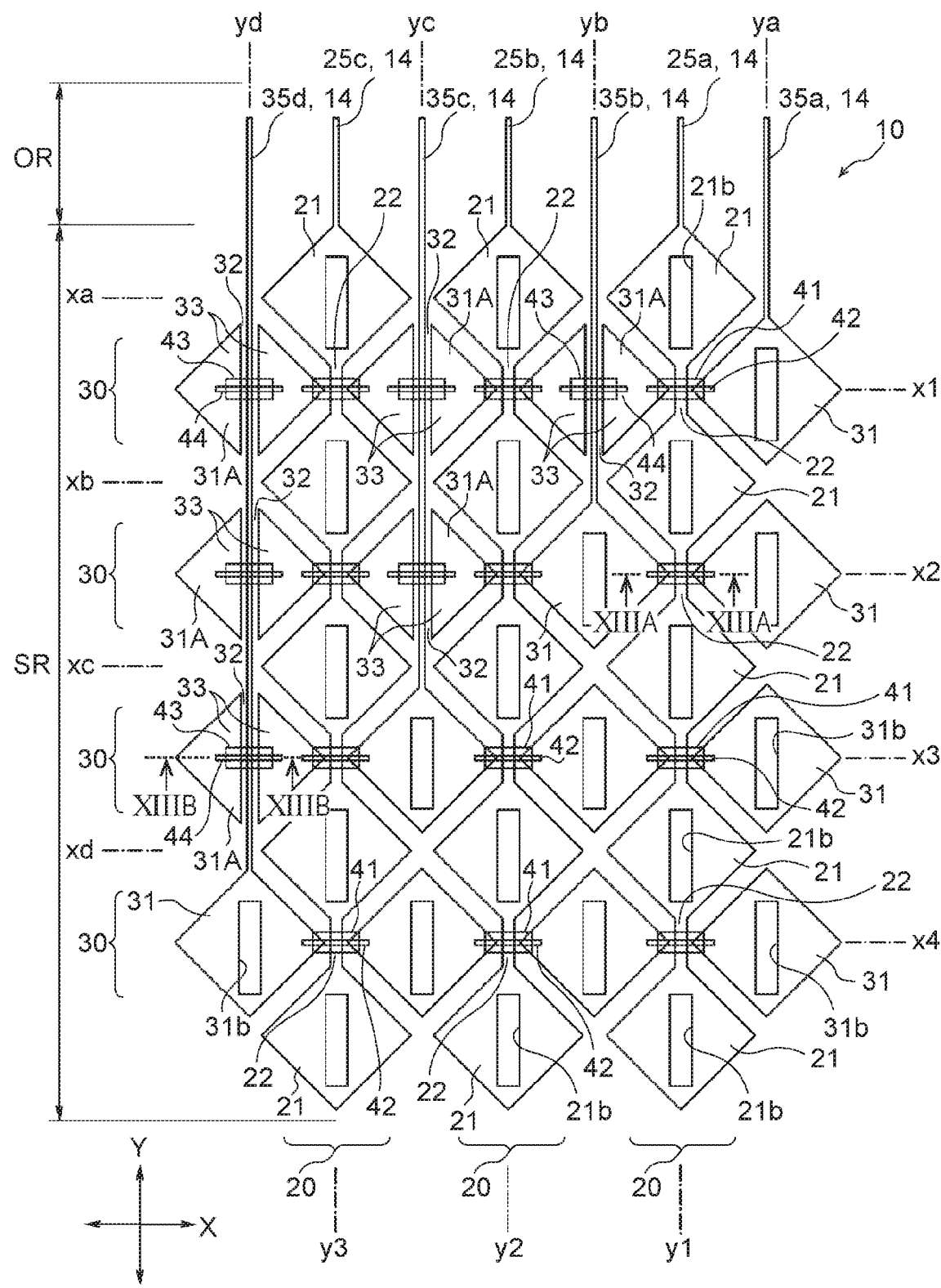
FIG. 12 is a schematic plan view illustrating the placement of electrodes.
Figure 13A:
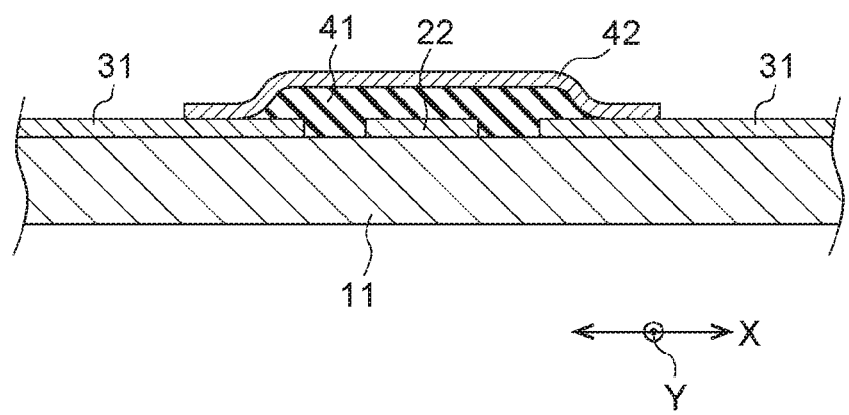
FIGS. 13A and 13B are schematic cross-sectional views of a bridge wire part.
Figure 13B:
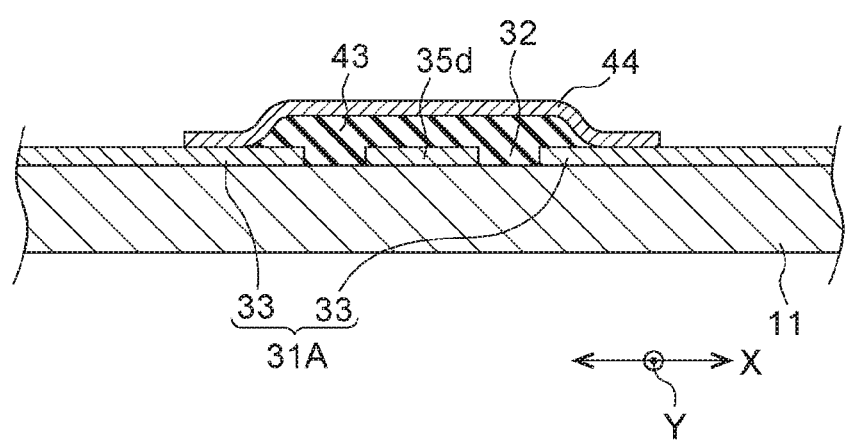

Next, the first electrode part 21, second electrode part 31, and lead wire 14 will be described in detail. FIG. 12 is a schematic plan view illustrating the placement of electrodes. FIGS. 13A and 13B are schematic cross-sectional views of a bridge wire part.

As illustrated in FIG. 12, first electrode strings 20 extending in the first direction (Y direction) on the surface of the base material 11 and second electrode strings 30 extending in the second direction (X direction) are formed on the base material 11. In the first electrode string 20, a plurality of first electrode parts 21 and linking parts 22, which link the first electrode parts 21 in the Y direction, are integrally formed. Although three columns, y1, y2 and y3, of first electrode strings 20 are provided, the number of columns is selected according to the area of the input device 10.

The first electrode part 21 is in a substantially square shape (or substantially rhombus shape), and the corners of the substantially square shape are oriented in the X direction and Y direction. Each linking part 22 links the Y-direction corners of two first electrode parts 21 adjacent in the Y direction.

Second electrode strings 30 are orderly placed at equal pitches along four rows, x1, x2, x3 and x4, in the X direction, and second electrode parts 31 included in the second electrode strings 30 are orderly placed along columns ya, yb, yc, and yd in the Y direction. The number of rows in the X direction and the number of columns in the Y direction are selected according to the area of the input device 10. The second electrode part 31 is in a substantially square shape (or substantially rhombus shape), and the corners of the second electrode part 31 are oriented in the X direction and Y direction. There is an approximate match between the size of each side of the quadrangle of the first electrode part 21 and the size of each side of the quadrangle of the second electrode part 31.

Some second electrode parts 31 have a wire path 32 at their centers. To distinguish from the second electrode part 31 that lacks the wire path 32, the second electrode parts having the wire path 32 will be denoted 31A.

In the second electrode part 31A, the wire path 32 linearly extends in the Y direction. The wire path 32 is formed at the center of the second electrode part 31A in the X direction so that the second electrode part 31A is equally divided in the X direction. The second electrode part 31A is divided into two segmented electrode layers 33 by the wire path 32.

The first electrode part 21, linking part 22, and second electrode parts 31 and 31A are formed from the same conductive material having translucency. The conductive material having translucency is an ITO material, a metal nanowire typified by a silver nanowire, a thin metal formed like a mesh, a conductive polymer, or the like.

FIG. 13A illustrates a cross-sectional view (taken along line XIIIA-XIIIA) of the laminated structure at an intersection between the first electrode string 20 in column y1 and the second electrode string 30 in row x2 in FIG. 12. At this intersection, a first insulating layer 41 having translucency is formed, the first insulating layer 41 covering the linking part 22 of the first electrode string 20. A first bridge connecting layer 42 is formed on the first insulating layer 41. Second electrode parts 31 adjacent to both ends of the linking part 22 in the X direction are mutually connected by the first bridge connecting layer 42 and become electrically continuous to each other.

The first insulating layer 41 and first bridge connecting layer 42 are formed at all intersections between the first electrode strings 20 and the second electrode strings 30. The second electrode parts 31 and 31A arranged in row x1 are linked in the X direction. In rows x2, x3, and x4, the second electrode parts 31 and 31A are similarly linked in the X direction.

The first insulating layer 41 having translucency is formed from a novolak resin or a combination of a novolak resin and an acrylic resin. The first bridge connecting layer 42 has the same layer structure as the flexible laminated body 15. That is, the first bridge connecting layer 42 has a laminated structure including the first amorphous ITO layer 151, conductive layer 152, and second amorphous ITO layer 153.

When the first electrode part 21, linking part 22, and second electrode part 31 are each formed as an ITO layer, if they are made of a crystallized ITO material, it becomes possible to selectively etch the crystallized ITO layers forming the first electrode part 21, linking part 22 and second electrode part 31 and the material forming the first insulating layer 41. The surfaces, facing the flexible laminated body 15, of the connection part 141*a* of the first wire part 141 and the connection part 142*b* of the second wire part 142, the connection part 141*a* and 142*b* being connected to the flexible laminated body 15, are preferably a crystallized ITO surface. Therefore, if the first electrode part 21, linking part 22, and second electrode part 31 are made of a crystallized ITO material, it becomes possible to integrally form the first electrode part 21, the linking part 22, the second electrode part 31, and portions including the connection part 141*a* of the first wire part 141 and the connection part 142*a* of the second wire part 142 from a crystallized ITO material.

At an intersection between the first electrode string 20 and the second electrode string 30, a linking part that mutually links second electrode parts 31 and 31A adjacent in the X direction may be formed integrally with the second electrode parts 31 and 31A, and a plurality of second electrode parts 31 and 31A may be continuously formed in the X direction. In this case, first electrode parts 21, which are mutually independent, are placed at both ends of the relevant second electrode part 31 or 31A in the Y direction with the linking part interposed therebetween, the first insulating layer 41 and first bridge connecting layer 42 are formed on the linking part linking the second electrode parts 31 and 31A together, and first electrode parts 21 adjacent in the Y direction are connected by the first bridge connecting layer 42.

As illustrated in FIG. 12, the peripheral region OR formed at an end of the base material 11 in the Y direction includes a first wiring layer 25*a* formed integrally with the first electrode part 21 in column y1, a first wiring layer 25*b* formed integrally with the first electrode part 21 in columns y2, and a first wiring layer 25*c* formed integrally with the first electrode part 21 in columns y3. The peripheral region OR also includes second wiring layers 35*a*, 35*b*, 35*c*, and 35*d*, which are electrically continuous to second electrode strings 30. The first wiring layers 25*a*, 25*b* and 25*c* and the second wiring layers 35*a*, 35*b*, 35*c* and 35*d* are each the lead wire 14.

The first wiring layers 25*a*, 25*b* and 25*c* and the second wiring layers 35*a*, 35*b*, 35*c* and 35*d* are routed in the peripheral region OR and are electrically continuous to the metal layers 142*c* of the relevant second wire parts 142 provided in the peripheral region OR.

As illustrated in FIG. 12, the second wiring layer 35*a* is formed integrally with the second electrode part 31 positioned at the intersection between row x1 and column ya, and the second wiring layer 35*b* is formed integrally with the second electrode part 31 positioned at the intersection between row x2 and column yb. This second wiring layer 35*b* passes through the interior of the wire path 32 formed in the second electrode part 31A positioned at the intersection between row x1 and column yb, and linearly extends in the Y direction to the peripheral region OR.

The second wiring layer 35*c* is formed integrally with the second electrode part 31 positioned at the intersection between row x3 and column yc. This second wiring layer 35*c* passes through the interior of the wire path 32 formed in the second electrode part 31A positioned at the intersection between row x2 and column yc and the interior of the wire path 32 formed in the second electrode part 31A positioned at the intersection between row x1 and column yc, and linearly extends in the Y direction to the peripheral region OR.

The second wiring layer 35*d* is formed integrally with the second electrode part 31 positioned at the intersection between row x4 and column yd. This second wiring layer 35*d* passes through the interior of the wire path 32 formed in the second electrode part 31A positioned at the intersection between row x3 and column yd, the interior of the wire path 32 formed in the second electrode part 31A positioned at the intersection between row x2 and column yd, and the interior of the wire path 32 formed in the second electrode part 31A positioned at the intersection between row x1 and column yd, and linearly extends in the Y direction to the peripheral region OR.

The second wiring layer 35*a* is electrically continuous to the second electrode parts 31 and 31A constituting the second electrode string 30 positioned in row x1. Similarly, the second wiring layers 35*b*, 35*c* and 35*d* are electrically continuous to the second electrode parts 31 and 31A constituting the second electrode strings 30 positioned in rows x2, x3 and x4, respectively. The second wiring layers 35*a*, 35*b*, 35*c*, and 35*d* are all formed integrally with the relevant second electrode part 31 by using the translucent conductive material constituting the second electrode part 31.

FIG. 13B illustrates a cross-sectional view (taken along line XIIIB-XIIIB) of the laminated structure at an intersection between the first electrode string 20 in row x3 and the second electrode string 30 in column yd in FIG. 12.

The second electrode part 31A is divided into two segmented electrode layers 33 by the wire path 32. A second insulating layer 43 is formed on the wire path 32 and second wiring layer 35*d*, and a second bridge connecting layer 44 is formed on the second insulating layer 43. The segmented electrode layers 33, into which the second electrode part 31A has been divided by the wire path 32, are mutually connected by the second bridge connecting layer 44. This enables the whole of the second electrode part 31A to function as a single electrode layer. This is also true for all second electrode parts 31A provided at other places.

The second insulating layer 43 illustrated in FIG. 13B is formed from the same material as the first insulating layer 41 illustrated in FIG. 13A in the process in which the first insulating layer 41 is formed. The second bridge connecting layer 44 illustrated in FIG. 13B is formed from the same material as the first bridge connecting layer 42 illustrated in FIG. 13A in the process in which the first bridge connecting layer 42 is formed.

In the manufacturing process of the input device 10, a raw material including a layer formed from a translucent conductive material such as an ITO material is used on the surface of the base material 11. A preferable translucent conductive material is a crystallized ITO material. By etching this conductive material, the first electrode string 20, second electrode string 30, first wiring layers 25*a*, 25*b* and 25*c*, and second wiring layers 35*a*, 35*b*, 35*c* and 35*d* are formed. Part of the first wire part 141 and second wire part 142 is also formed.

After that, a resin layer including a novolak resin and acrylic resin are formed on the base material 11, and the first insulating layer 41 and second insulating layer 43 are concurrently patterned in a photolithography process. In addition, a laminated body for use as a bridge connecting layer is formed, and the first bridge connecting layer 42 and second bridge connecting layer 44 are concurrently formed by an etching process. The laminated body for use as a bridge connecting layer is formed in the peripheral region OR as well. The flexible laminated body 15 is formed so as to connect the connecting part 141a of the first wire part 141 and the connecting part 142a of the second wire part 142 in the process in which the first bridge connecting layer 42 and second bridge connecting layer 44 are formed by etching.

With the input device 10, an image displayed on the display panel 7 is visible from the outside through the base material 11 and panel section 3b. The input device 10 can be manipulated by touching the panel section 3b with a finger while viewing the image.

With this input device 10, capacitances are formed between the first electrode strings 20 and the second electrode strings 30. Pulse-shaped driving electric power is sequentially given to any one type of electrode strings, first electrode strings 20 or second electrode strings 30. When the driving electric power is given to an electrode string, a sensing current flowing in the other electrode string is detected. When a finger comes close to the panel section 3b, a capacitance is formed between the finger and an electrode layer. Thus, the detected current changes. When this change in the detected current is sensed, it is possible to detect the place, on the panel section 3b, to which the finger is coming close.

Since the wire path 32 passing in the Y direction is formed in the second electrode part 31A, its area is essentially smaller than the area of an electrode not having the wire path 32, so sensitivity may vary for each electrode layer in a sensing operation. In view of this, an opening 31b is formed in the second electrode part 31, in which the wire path 32 is not formed, so that a difference in the area does not become so large between the second electrode part 31A having the wire path 32 and the second electrode part 31 not having the wire path 32.

In addition, an opening 21b is formed in the first electrode part 21 as well so that a difference in the area does not become so large between the first electrode part 21 and the second electrode part 31A.

In the input device 10, the second wiring layers 35b, 35c, and 35d pass through the interior of the wire path 32 formed in the second electrode part 31A and extend in the Y direction. Since the second wiring layers 35b, 35c, and 35d are narrowed by the segmented electrode layers 33 of the second electrode part 31A at both ends in the X direction, regions adjacent to the second wiring layers 35b, 35c and 35d and the relevant first electrode part 21 can be reduced. Thus, static coupling between the first electrode part 21 and each of the second wiring layers 35b, 35c and 35d can be lowered. Accordingly, it can be suppressed that the routed parts of the second wiring layers 35b, 35c, and 35d have extra sensitivity, so noise is less likely to be superimposed on outputs actually sensed between the first electrode string 20 and the second electrode string 30. Therefore, it becomes possible to increase sensing precision.

Since the second wiring layers 35b, 35c, and 35d pass through the interior of the second electrode part 31A, there is no need to form, between adjacent electrode layers, a path through which the second wiring layer passes. Therefore, placement of the first electrode parts 21 and second electrode parts 31 is not restricted by the routing of the second wiring layers. For example, the first electrode part 21 and second electrode part 31 can be placed so as to be brought close to each other, so it becomes possible to increase resolution in sensing operation.

As described above, according to the embodiment, it is possible to provide an input device that enables wires to be bent together with a base material without impairing translucency and conductivity of the wires.

So far, an embodiment and examples of the present invention have been described. However, the present invention is not limited to the embodiment and examples. For example, the scope of the present invention also includes embodiments and examples obtained as a result of adding or deleting constituent element to or from the above embodiment or examples, performing design changes to the above embodiment or examples, or combining features of exemplary structures in the embodiment or examples, as long as the intended scope of the invention is included; the additions, deletions, design changes, or combination is appropriately effected by a person having ordinary skill in the art.

What is claimed is:

1. An input device comprising:
   a base made of a material having translucency and flexibility, a sensing region and a peripheral region outside the sensing region being defined on the base, the base having a bent portion provided in the peripheral region;
   a plurality of first electrodes having translucency, the plurality of first electrodes being disposed in the sensing region on the base and arranged in a first direction;
   a plurality of second electrodes having translucency, the plurality of second electrodes being disposed in the sensing region on the base and arranged in a second direction crossing the first direction;
   a linking part having translucency and integrally formed with the plurality of first electrodes, the linking part connecting two adjacent electrodes of the plurality of first electrodes;
   a first bridge connecting part formed over the linking part with a first insulating layer interposed therebetween, the first bridge connecting part electrically connecting two adjacent electrodes of the plurality of second electrodes;
   a plurality of lead wires electrically connected to the plurality of first electrodes and the plurality of second electrodes, the plurality of lead wires extending from within the sensing region to the peripheral region on the base, each of the plurality of lead wires including:
      a first wire portion having translucency and disposed in the peripheral region closer to the sensing region with respect to the bent portion;
      a second wire portion disposed in the peripheral region farther from the sensing region with respect to the bent portion; and
      a flexible conductive member provided on the bent portion between the first wire portion and the second wire portion, so as to electrically connect the first wire portion and the second wire portion; and
   a covering material disposed so as to cover at least part of the flexible conductive member on the bent portion,
   wherein the plurality of second electrodes include at least one divided electrode divided into a pair of electrode parts so as to provide a wire path therebetween extending in the first direction, such that at least one of the plurality of lead wires extends through the wire path and electrically connects to another of the plurality of second electrodes,
   and wherein the input device further comprises:
      a second bridge connecting part formed across the wire path and the lead wire therein so as to electrically connect the corresponding pair of electrode parts; and
      a second insulating layer interposed between the second bridge connecting part and the lead wire.

2. The input device according to claim 1, wherein the covering material is made of a resin-based material.

3. The input device according to claim 1, further comprising a reinforcing member that lowers a degree of bending of the flexible conductive member.

4. The input device according to claim 3, wherein the reinforcing member is formed of a reinforcing film provided on the base on an opposite side of the bent portion on which the flexible conductive member is disposed.

5. The input device according to claim 1, further comprising an optical adhesive layer provided so as to cover the sensing region on the base.

6. The input device according to claim 5, wherein the optical adhesive layer extends from the sensing region toward the peripheral region so as to form a laminated structure including the flexible conductive member, the covering material, and the optical adhesive layer.

7. The input device according to claim 5, wherein the optical adhesive layer extends from the sensing region toward the peripheral region so as not to cover a bent portion of the flexible conductive member.

8. The input device according to claim 1, wherein the flexible conductive member is formed of a flexible laminated body including:
    a first amorphous ITO layer provided on the base;
    a conductive layer provided on the first amorphous ITO layer; and
    a second amorphous ITO layer provided on the conductive layer.

9. The input device according to claim 1, wherein a part of the peripheral region of the base extends from the sensing region toward the bent portion in a first direction, and the part of the peripheral region of the base further extends from the bent portion farther away from the sensing region in a second direction different from the first direction.

10. An input device comprising:
    a base made of a material having translucency and flexibility, a sensing region and a peripheral region outside the sensing region being defined on the base, the base having a bent portion in the peripheral region;
    a plurality of first electrodes having translucency, the plurality of first electrodes being disposed in the sensing region on the base and arranged in a first direction;
    a plurality of second electrodes having translucency, the plurality of second electrodes being disposed in the sensing region on the base and arranged in a second direction crossing the first direction;
    a linking part having translucency and integrally formed with the plurality of first electrodes, the linking part connecting two adjacent electrodes of the plurality of first electrodes;
    a first bridge connecting part formed over the linking part with a first insulating layer interposed therebetween, the first bridge connecting part electrically connecting two adjacent electrodes of the plurality of second electrodes;
    a plurality of lead wires electrically connected to the plurality of first electrodes and the plurality of second electrodes, the plurality of lead wires extending from within the sensing region to the peripheral region on the base, each of the plurality of lead wires having a flexible conductive member provided on the bent portion; and
    a covering material disposed so as to cover at least part of the flexible conductive member on the bent portion,
    wherein the plurality of second electrodes include at least one divided electrode divided into a pair electrode parts so as to provide a wire path therebetween extending in the first direction, such that at least one of the plurality of lead wires extends through the wire path and electrically connects to another of the plurality of second electrodes,
    and wherein the input device further comprises:
        a second bridge connecting part formed across the wire path and the lead wire therein so as to electrically connect the corresponding pair of electrode parts; and
        a second insulating layer interposed between the second bridge connecting part and the lead wire.

11. The input device according to claim 10, wherein the covering material is made of a resin-based material.

12. The input device according to claim 10, further comprising a reinforcing member that lowers a degree of bending of the flexible conductive member.

13. The input device according to claim 12, wherein the reinforcing member is formed of a reinforcing film provided on the base on an opposite side of the bent portion on which the flexible conductive member is disposed.

14. The input device according to claim 10, further comprising an optical adhesive layer provided so as to cover the sensing region on the base.

15. The input device according to claim 14, wherein the optical adhesive layer extends from the sensing region toward the peripheral region so as to form a laminated structure including the flexible conductive member, the covering material, and the optical adhesive layer.

16. The input device according to claim 14, wherein the optical adhesive layer extends from the sensing region toward the peripheral region so as not to cover a bent portion of the flexible conductive member.

17. The input device according to claim 10, wherein the flexible conductive member is formed of a flexible laminated body including:
    a first amorphous ITO layer provided on the base;
    a conductive layer provided on the first amorphous ITO layer; and
    a second amorphous ITO layer provided on the conductive layer.

18. The input device according to claim 10, wherein a part of the peripheral region of the base extends from the sensing region toward the bent portion in a first direction, and the part of the peripheral region of the base further extends from the bent portion farther away from the sensing region in a second direction different from the first direction.

* * * * *